Figure 1:
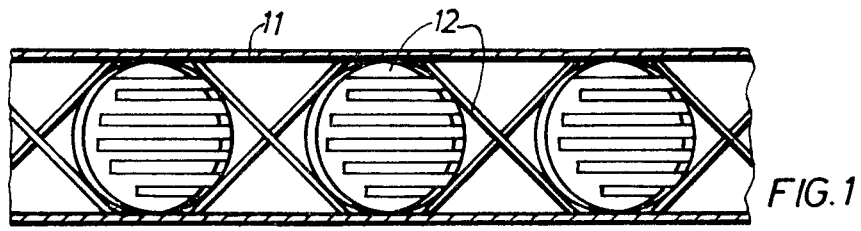

United States Patent [19]

Feltgen et al.

[11] 4,145,520

[45] Mar. 20, 1979

[54] PROCESS FOR THE CONTINUOUS POLYMERIZATION OF LACTAMS WITH STATIC MIXERS

[75] Inventors: Karlheinz Feltgen, Straberg; Hans J. Kaluza, Cologne; Edgar Muschelknautz, Leverkusen; Hans J. Simon, Dormagen, all of Fed. Rep. of Germany

[73] Assignee: Bayer Aktiengesellschaft, Leverkusen, Fed. Rep. of Germany

[21] Appl. No.: 833,642

[22] Filed: Sep. 15, 1977

Related U.S. Application Data

[63] Continuation of Ser. No. 620,312, Oct. 7, 1975, abandoned.

[30] Foreign Application Priority Data

Oct. 9, 1974 [DE] Fed. Rep. of Germany ....... 2448100

[51] Int. Cl.$^2$ ............................................. C08G 69/16
[52] U.S. Cl. .................................................... 528/323
[58] Field of Search ...................... 260/78 L; 528/323

[56] References Cited

U.S. PATENT DOCUMENTS

| | | | |
|---|---|---|---|
| 2,562,796 | 7/1951 | Koch | 260/78 L |
| 2,735,839 | 2/1956 | Schrenk | 260/78 L |
| 2,735,840 | 2/1956 | Lynch | 260/78 L |
| 2,889,211 | 6/1959 | Rodenacker et al. | 260/78 L |
| 3,044,993 | 7/1962 | Tiemersma | 260/78 L |
| 3,458,482 | 7/1969 | Goto et al. | 260/78 L |
| 3,644,296 | 2/1972 | Bosch | 260/78 L |
| 3,813,366 | 5/1974 | Wright et al. | 260/78 L |
| 3,948,862 | 4/1976 | Iwasyk | 260/78 R |

*Primary Examiner*—Harold D. Anderson
*Attorney, Agent, or Firm*—Plumley and Tyner

[57] ABSTRACT

The invention relates to a process for the continuous polymerization of caprolactam in a reactor, wherein a reactor in which the first 60% of the reactor volume is equipped if possible completely but at least to one-third with static mixing installations is used.

8 Claims, 10 Drawing Figures

PROCESS FOR THE CONTINUOUS POLYMERIZATION OF LACTAMS WITH STATIC MIXERS

This is a continuation of application Ser. No. 620,312, filed Oct. 3, 1975, now abandoned.

This invention relates to a process for the continuous preparation of polyamides, preferably from ε-caprolactam as the main or only component, to which, for example, matting agents, colouring agents or light and heat stabilizing substances may be added.

It is known to carry out the continuous polymerisation of polyamides in apparatus of various constructions. In the simplest case, the reactor consists of a simple, vertical tube into which caprolactam, for example, is introduced at the top and from which polymer is removed at the bottom while water is driven off as steam at the top. The desire to control the rate of removal of water in accordance with reaction kinetic considerations has led to the development of multistage tubes, in which the various stages may be telescoped into each other. In the latter case, ascending and descending streams of melt are obtained.

Other devices provided on and in the reactor have the object of imparting a desired temperature profile to the caprolactam which is undergoing polymerisation. This is achieved by simply heating the wall of the reactor or by installing heat exchangers, for example in the form of plates or nests of tubes arranged parallel to the direction of flow. It has been found suitable to carry out the initial phase of the reaction at temperatures above 205° C. and the final phase below 250° C., that is to say heat is applied to the top of a VK tube (e.g. the VK-process is described in "Kunststoffhandbuch" Vol. VI, Carl Hauser Verlag Munich (1966) page 191) and removed in the lower part by a suitable heat exchanger. It is important to ensure that cooling sets in only when the conversion of caprolactam, which, as is well known, is a polyaddition reaction, has been substantially completed.

Other developments of the process have the subject of ensuring more or less thorough mixing of the caprolactam which is to be polymerised, either in order to stir additives into the caprolactam in the initial phase or in order to obtain a homogeneous melt. The mechanical stirrers of various construction frequently used for this purpose are unsatisfactory, firstly because they are liable to give trouble due to driving and sealing problems and secondly because they do not help to produce the required plug flow. Among the various solutions to overcome this difficulty, it has been proposed to use cascades of stirrer vessels which contribute to the formation of plug flow and the more so the larger the number of vessels arranged in series. This solution, however, resulted in systems which were very complicated and therefore liable to give trouble so that it was not possible to ensure an absolutely constant reaction process which is necessary in order to obtain high quality products.

It is also known to influence the flow in a VK tube by installing various devices in the interior of the tube, for example V-shaped or perforated baffle plates, conical hollow bodies or concentrically arranged annular surfaces extending parallel to the direction of flow to act as braking surfaces with a view to improve the flow of the melt, but none of these devices has been found to be completely satisfactory.

The so-called static mixers which have recently become known provide a combination of a mixing action and an action which influences the flow.

It is an object of the present invention to improve the process for the continuous polymerisation of ε-caprolactam so that not only a thoroughly mixed melt flowing as a plug flow is obtained but also the output is at least 20% higher than can be achieved in prior art processes.

This problem is solved by carrying out the continuous polymerisation of caprolactam in a reactor in which the first 60% of the reactor volume is equipped if possible completely but at least to one-third with suitable static installations.

According to the invention there is provided a process for the continuous polymerisation of caprolactam in a reactor, wherein at least one-third of the first 60% of the reactor volume is equipped with static mixing installations.

The reactor tubes of this invention contain at least one mixing insert consisting of webs inclined at an angle to each other. In one embodiment, these webs intersect, the inserts consisting of at least two slotted plates set at an angle to each other inside the housing and intermeshing through the slots. In another embodiment, the webs set at an angle to each other do not intersect but contact each other along an edge to form a gable with its axis perpendicular to the axis of the tube.

As the stream of material encounters the webs, it is split up into a number of individual streams separated from one another in time and space due to the oblique positioning of the webs. On the downstream side of the webs there is a flow gradient in the transverse direction which ensures efficient exchange between the individual streams. Since division of the stream of material into separate streams is staggered in time and space, mixing also takes place in the direction of flow and this is superimposed by radial flow components. With the transverse mixing which can be achieved it is possible to obtain a good approximation to a plug flow profile so that a narrow spectrum of dwell times within the reactor can be obtained, which is advantageous for caprolactam polymerisation. The inclination of the webs to the direction of the oncoming flow and to the wall of the tube may also be in more than one dimension. Additional mixing effects are thereby obtained.

According to one particular embodiment, the mixing insert comprises a plurality of pairs of plates which have a comb-like structure, and the plates are arranged in two rows so that the webs of at least two layers of one row intersect the webs of at least one layer of the other row.

Several lines of intersection are thereby produced, along which the partial streams are further subdivided.

The plates of each row are preferably arranged parallel to each other. This arrangement provides the possibility of more rational manufacture of the plates.

According to one particularly advantageous embodiment, several mixing inserts are provided and the webs of the pairs of plates of the mixing inserts are set at an angle to each other. This angle may be, for example, 90°. With an angle of 90°, the required length of the apparatus is particularly short because the plates of the pairs of plates or the plates of the outer pairs of plates of adjacent mixing inserts can then be pushed far into the gaps between the pairs of plates of the adjacent insert. The angular displacement between the mixing inserts in a row results in a subdivision in space of the individual streams which are produced by the webs. With this embodiment, very powerful mixing effects can be obtained with only a few mixing inserts arranged in a row.

The plates are preferably in the form of combs which have a generally elliptical outline, and in order to improve the flow in the marginal zones of the tube, the web connecting part is shifted from the wall of the tube towards the centre of the tube. In a rational manufacturing process, this can be achieved by punching out. It goes without saying that other manufactured processes are also suitable for manufacturing the mixing inserts, for example large mixing inserts can be produced by welding. The plates may be constructed, for example, by fixing the webs to a closed ring. The webs and slots are preferably arranged parallel to the main axis of the plates. This constitutes another advantage with regard to manufacture of the plates.

According to a particular embodiment, the webs have a special cross-sectional profile, for example they may be triangular, tear-shaped or elliptical. Special flow effects which ensure vigorous mixing in the transverse direction, for example, are obtained in the case of a triangular section if one edge is at an angle against or in the direction of flow. The webs may also have a hollow profile. In that case, they may be traversed by a heating fluid, for example, so that they also perform a heat transfer function.

If it is desired to vary the velocity of flow of the medium at the centre of the tube as compared with the wall, it is advantageous to vary the width of the webs. The flow is then displaced further towards the centre or towards the periphery according to whether the webs are wider or narrower towards the centre or the periphery.

The various possible variations of the apparatus for carrying out continuous caprolactam polymerisation afford the constructional engineer wide scope for optimising the apparatus. In particular, the mixing inserts can be constructed from variously formed webs, or variously formed mixing inserts with similar webs can be arranged behind one another in a suitable sequence. In this way it is possible to adapt the mixing inserts to special operating factors such as the flow velocity, the viscosity and the residence time of the reactants in the various sections.

Various embodiments of the apparatus according to the invention are shown purely diagrammatically in the accompanying drawings and described below.

Figure 4:
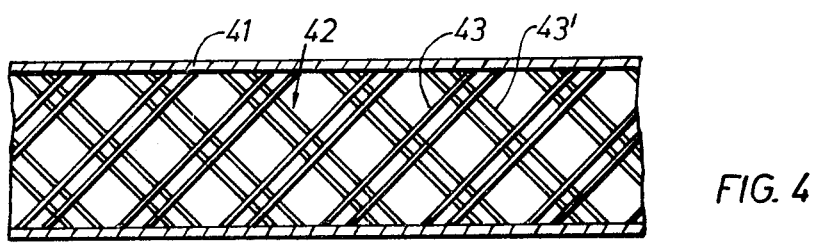
Figure 5:
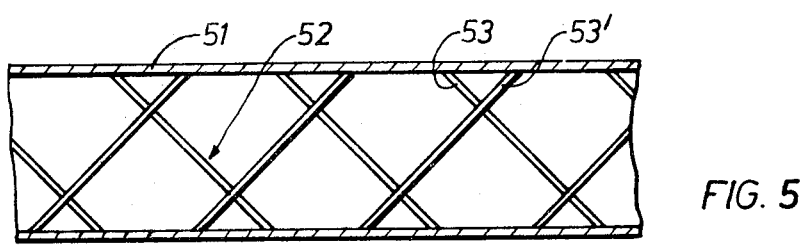
Figure 6:
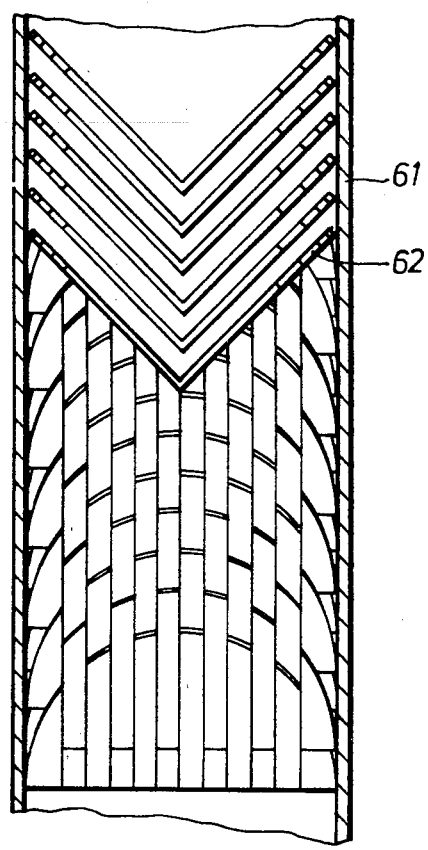

FIGS. 1 to 5 represent various constructional examples of the apparatus with different arrangements of the mixing inserts or plates and FIG. 6 shows an example in which the webs do not intermesh.

In FIGS. 1 to 6, similar parts have been indicated by reference numerals having the same digits in the unit place preceded by a digit representing the number of the figure.

FIG. 1 shows several mixing inserts 12 arranged behind one another at angles of 90° to each other inside a tube 11. The mixing inserts are formed by intermeshing comb-like plates.

Figure 2:
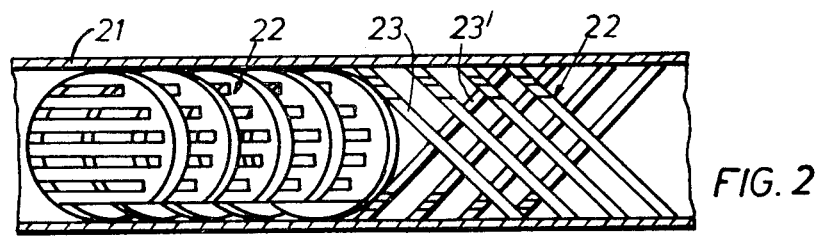

FIG. 2 shows mixing inserts 22 arranged in a tube 21. Each insert consists of five pairs of plates 23, 23'. The mixing inserts 22 are displaced by an angle of 90° relative to each other. Plates 23, 23' have the same configuration as in FIG. 1.

Figure 3:
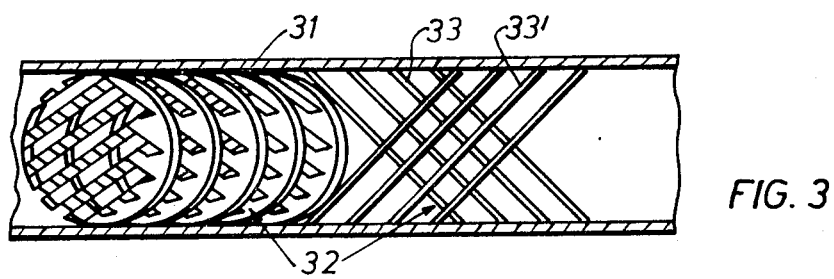

The mixing inserts 32 arranged in tube 31 in FIG. 3 are similar in form to those shown in FIG. 2 but in this case the oblique webs are in addition inclined to their longitudinal axis.

FIG. 4 shows a tube 41 containing mixing inserts 42 which merge into each other in that the plates 43, 43' in each case extend through several intersecting plates. The plates are arranged that there are always two parallel plates 43, 43' set close to each other while the distance between these two plates and the next following two plates is about twice as great as the distance of the first two plates to each other.

In the embodiment shown in FIG. 5, a tube 51 contains mixing inserts 52 in which plates 53, 53' intersect not only each other but also the plates of adjacent mixing inserts 52, as in the example shown in FIG. 4, so that individual mixing inserts cannot be exactly defined. In this embodiment, importance is attached to placing the lines of intersection outside the central axis of the tube 51.

Alternatively, the lines of intersection may be dispensed with, as in the embodiment shown in FIG. 6, and the individual webs may be connected along their edges to form V-shaped inserts. In this embodiment, all the adjacent layers of webs may be displaced from each other in any way desired.

FIGS. 7 to 10 show diagrammatically reaction tubes for carrying out the process according to the invention. Similar parts have again been indicated by the same unit digits preceded by the number of the figure.

Figures 7, 8:
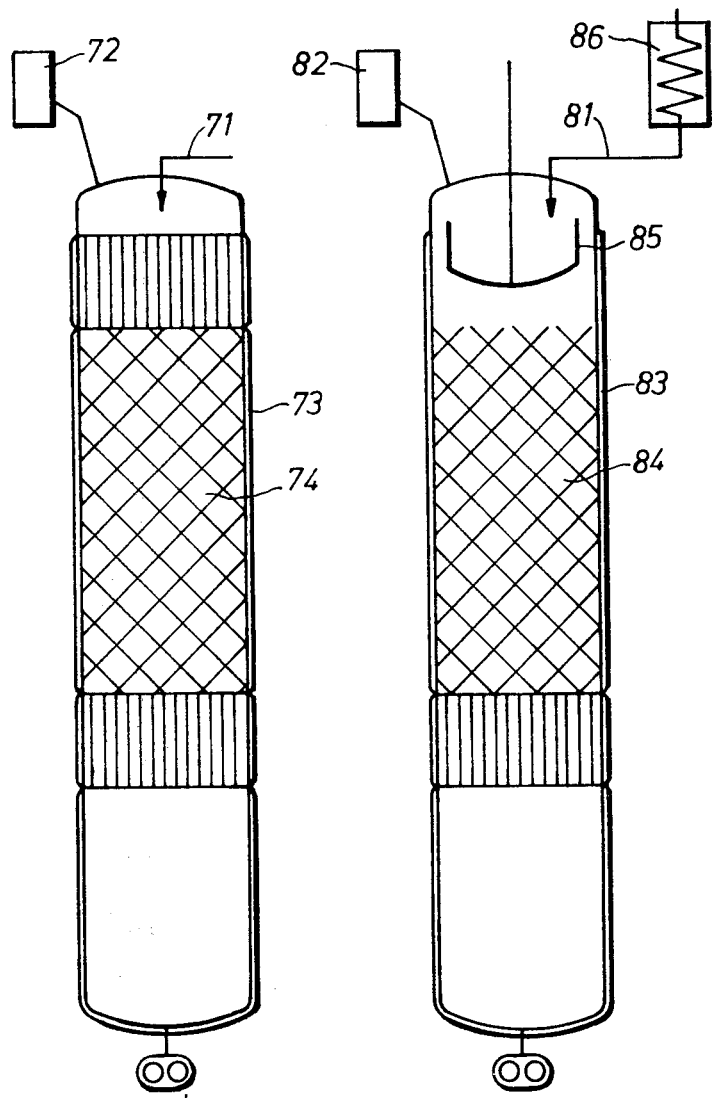
Figure 9:
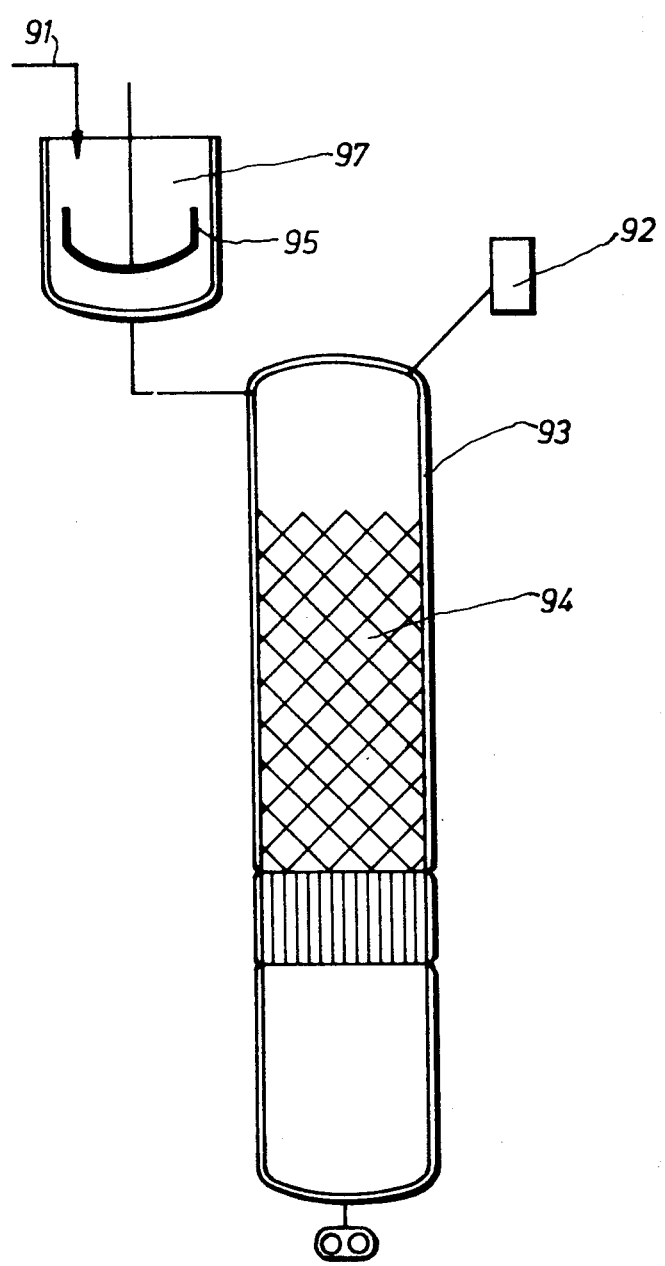
Figure 10:
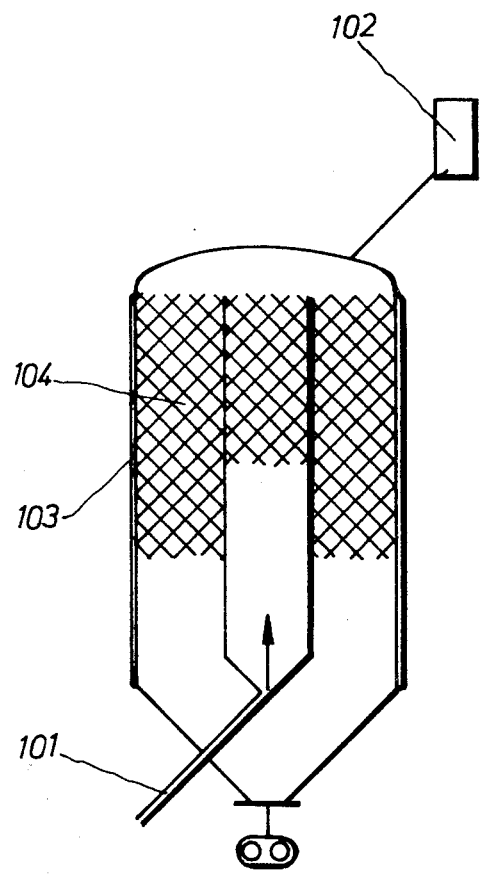

71, 81 91 and 101 indicate the lactam supply. 72, 82, 92, and 102 indicate a condenser. The reaction tubes 73, 83, 93 and 103 are equipped with static installations 74, 84, 94, and 104. In FIG. 9, a hydrolysis apparatus 97 equipped with a stirrer 95 is attached to the upstream end of the reaction tube. In FIG. 8, a stirrer 85 is provided inside the reaction tube. In this case, the lactam is preheated at 86.

It will, of course, only be possible to apply the previously described apparatus in accordance with the invention in cases where the stirrer or heat exchanger does not take up the entire volume of the reactor. It is, of course, possible and in many cases advisable, in the interests of obtaining a homogeneous melt with a plug flow to instal static units also in the last 40% of the reactor volume, but this is not necessary for the purpose of the invention. On the other hand, it would be quite insufficient for the purpose of the invention to equip only the last 40% of the reactor volume with these installations.

The known packing mixers which consists of a plurality of parallel, intersecting channels open to each other on one side are also suitable for carrying out caprolactam polymerisation in accordance with the invention, although for tubes of large diameter, in the case described here of the order of up to 1500 mm, these mixers are not sufficiently economical owing to the manufacturing costs and the high cost of thin sheet metal. Moreover, the pressure drop depends to a very great extent on the selected geometrical configuration of the channel, which is in some cases disadvantageous.

Static mixers which have to be very long in order to achieve a good mixing effect, for example one known embodiment consisting of a combination of alternately left-handed and right-handed helical elements, cannot be used in the process of the invention, with respect to the big diameters of VK-tubes. For special construction, e.g. by dividing the cross section of big VK-tubes into many parallel tubes of smaller diameters, this mixing unit could be suitable for carrying out caprolactam polymerisation, but with high costs of construction.

The effect of the present invention is illustrated by a comparison of the extract values of a polycaprolactam which has been obtained in a conventional polymerisation tube in Example A with those of a polycaprolactam which has been obtained according to Example B in a tube which is completely identical with the tube used in Example A but in addition is equipped with the installations according to the invention. The quantities of chain regulator and water and the reaction temperatures employed are also identical in the two cases. The lactam output from reactor A is 11.0 tons per day and from reactor B 12.1 tons per day. The extract values were obtained by the methanol method.

| Polymerisation tube A 11.0 tons per day output | Polymerisation tube B 12.1 tons per day output |
|---|---|
| 11.95 % extract | 9.54 % extract |
| 12.01 % extract | 9.84 % extract |
| 12.28 % extract | 9.11 % extract |
| 12.00 % extract | 9.85 % extract |
| 11.90 % extract | 9.78 % extract |
| 11.92 % extract | 9.99 % extract |
| 12.21 % extract | 9.23 % extract |

For kinetic reasons, caprolactam conversions of 90% and more can be achieved in hydrolytic caprolactam polymerisation. It is clear that this conversion can easily be achieved in a reaction tube B operated in accordance with the invention whereas the conversion rate in the normal reactor is in the region of 88% although the caprolactam output is about 10% lower.

We claim:

1. A process for continuous polymerization of caprolactam comprising heating caprolactam in a reactor under conditions sufficient to polymerize it to resinous polycaprolactam wherein said reactor comprises a reactor tube having a first end where caprolactam is fed and a second end where resinous polycaprolactam is removed, said reactor contains static mixing means in at least 30% of the first 60% of the reactor volume and said first 60% of reactor volume is measured from said first end.

2. Process according to claim 1, wherein the reactor tube used is one in which the first 30% of the reactor volume contains, as static mixing means, a mixing insert in the form of a pair of plates which have webs inclined at an angle to each other and to the axis of the reactor tube, the webs of the two layers either intermeshing like forks or abutting against each other along their edges in the centre of the tube to form a roof gable with the gable edge situated perpendicular to the axis of the tubes.

3. Process according to claim 1, wherein the reactor tube used is one in which the first 60% of the reactor volume contains, as static mixing means, a mixing insert comprising several comb-like pairs of plates, the plates being arranged in two rows so that the webs of two layers of one row intersect the webs of at least one layer of the other row.

4. Process according to claim 3, wherein the reactor tube used is one in which the first 60% of the reactor volume contains, as static mixing means, mixing insert in which the plates of each row are arranged parallel to each other.

5. Process according to claim 2, wherein the reactor tube used is one in which the first 60% of the reactor volume contains, as static mixing means, a mixing insert consisting of hollow section webs traversed by a heating medium, the webs being arranged at an angle to each other and to the axis of the reactor tube.

6. Process according to claim 3, wherein the reactor tube used is one in which the first 60% of the reactor volume contains, as static mixing means, a mixing insert consisting of hollow section webs through which a heating medium flows, the webs of two layers of one row intersecting the webs of at least one layer of the other row.

7. Process according to claim 2, wherein the reactor tube used is one in which the first 60% of the reactor volume contains, as static mixing means, a mixing insert in which the individual webs are welded and adjacent webs are arranged in any desired position in relation to each other.

8. The process of claim 1 in which the caprolactam conversion and polycaprolactam output obtained are higher than obtained with the same reaction conditions in a tube reactor without said static mixing means.

* * * * *